United States Patent
Lavra et al.

(10) Patent No.: US 9,275,508 B1
(45) Date of Patent: Mar. 1, 2016

(54) ELECTRONIC CONTAINER VENDING SYSTEM

(71) Applicant: Air Liquide Advanced Technologies U.S. LLC, Houston, TX (US)

(72) Inventors: Joshua Lavra, Walnut Creek, CA (US); Giuseppe Liberati, Houston, TX (US)

(73) Assignee: Air Liquide Advanced Technologies U.S. LLC, Houston, TX (US)

( * ) Notice: Subject to any disclaimer, the term of this patent is extended or adjusted under 35 U.S.C. 154(b) by 0 days.

(21) Appl. No.: 14/508,257

(22) Filed: Oct. 7, 2014

(51) Int. Cl.
- *G06F 7/08* (2006.01)
- *G07F 11/00* (2006.01)
- *G06Q 20/34* (2012.01)

(52) U.S. Cl.
CPC ............. *G07F 11/005* (2013.01); *G06Q 20/34* (2013.01)

(58) Field of Classification Search
CPC ....... G07F 7/08; G07F 7/1008; G06Q 20/342; G06Q 20/341
USPC .......................................... 235/381, 380, 385

IPC ..................... G07F 7/08,7/1008; G06Q 20/342, G06Q 20/341
See application file for complete search history.

(56) References Cited

U.S. PATENT DOCUMENTS

2007/0170201 A1* 7/2007 Steffens ......................... 221/265

* cited by examiner

*Primary Examiner* — Karl D Frech
(74) *Attorney, Agent, or Firm* — Elwood L. Haynes

(57) ABSTRACT

An electronic container vending machine is provided. Including at least one modular vending unit capable of incrementally rotating and locking in predetermined positions, and includes multiple discrete storage volumes each configured to contain a single container, an access means for accessing the interior of the rotatable container storage and dispensing unit, that is capable of switching between a locked state and an unlocked state, and that is configured to cooperate with the rotatable storage and dispensing unit. The modular vending unit also includes a control unit for communicating with a user and the at least one modular vending unit. The control unit also includes an electronic selection means configured to allow the acquisition or return of a container. The electronic selection device may be a multi-touch screen display. The electronic payment interface may include a credit card payment interface or an NFC payment interface.

10 Claims, 3 Drawing Sheets

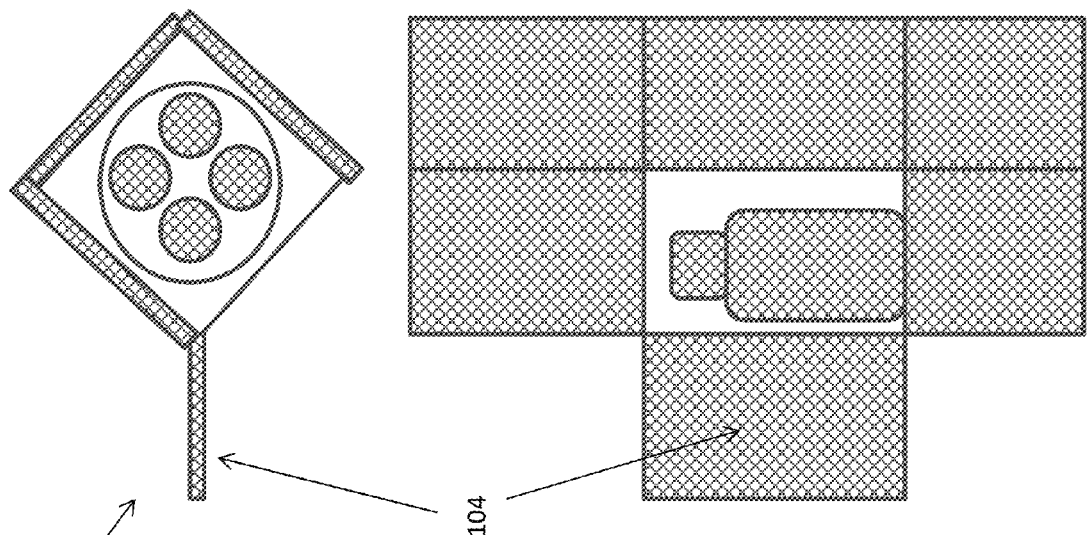
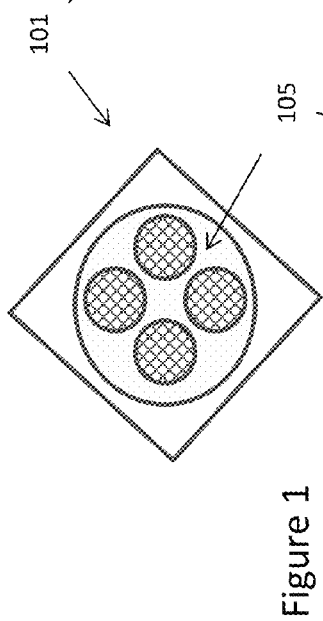
Figure 1
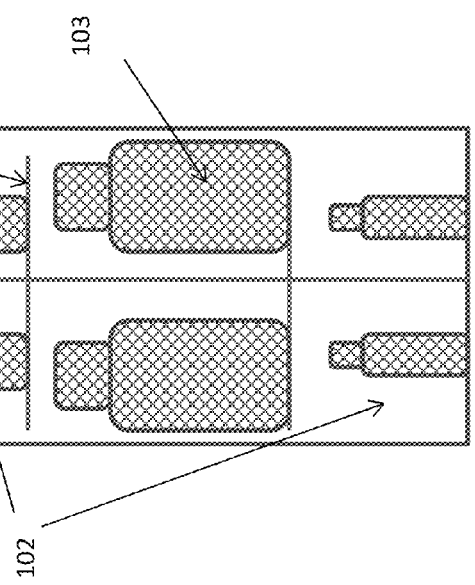
Figure 2

ELECTRONIC CONTAINER VENDING SYSTEM

BACKGROUND

The present invention relates generally to vending and dispensing machines and in particular to such a machine for vending a compressed gas cylinders, such as those used in welding.

Standard pressurized gas cylinders, such as the type typically used for shielding gas for welding and for cutting, pose vending problems. These cylinders have a cylindrically shaped tank, a valve at the top of the tank, and a guard substantially encircling the valve and providing a pair of lifting handles. The guard typically has a diameter smaller than the diameter of the outer surface of the tank. These standard cylinders can be relatively heavy, at least 20 pounds, possibly as heavy as 50 pounds.

It is the common practice for an individual, or small business, to acquire or exchange such pressurized gas cylinders at a store front. This can be inconvenient if the demand arises when the store is not open. Therefore, there is a need in the industry for a means for such small quantity users to obtain such cylinders around the clock, in a convenient and secure manner.

SUMMARY

An electronic container vending machine is provided. Including at least one modular vending unit capable of incrementally rotating and locking in predetermined positions, and includes multiple discrete storage volumes each configured to contain a single container, an access means for accessing the interior of the rotatable container storage and dispensing unit, that is capable of switching between a locked state and an unlocked state, and that is configured to cooperate with the rotatable storage and dispensing unit. The modular vending unit also includes a control unit for communicating with a user and the at least one modular vending unit. The control unit also includes an electronic selection means configured to allow the acquisition or return of a container. The electronic selection device may be a multi-touch screen display. The electronic payment interface may include a credit card payment interface or an NFC payment interface.

BRIEF DESCRIPTION OF THE FIGURES

FIG. 1 illustrates a modular vending unit, with the interior exposed for clarity, in accordance with one embodiment of the present invention.

FIG. 2 illustrates a modular vending unit, with the exterior covering included, to indicate the access means, in accordance with one embodiment of the present invention.

DETAILED DESCRIPTION

Figure 3:
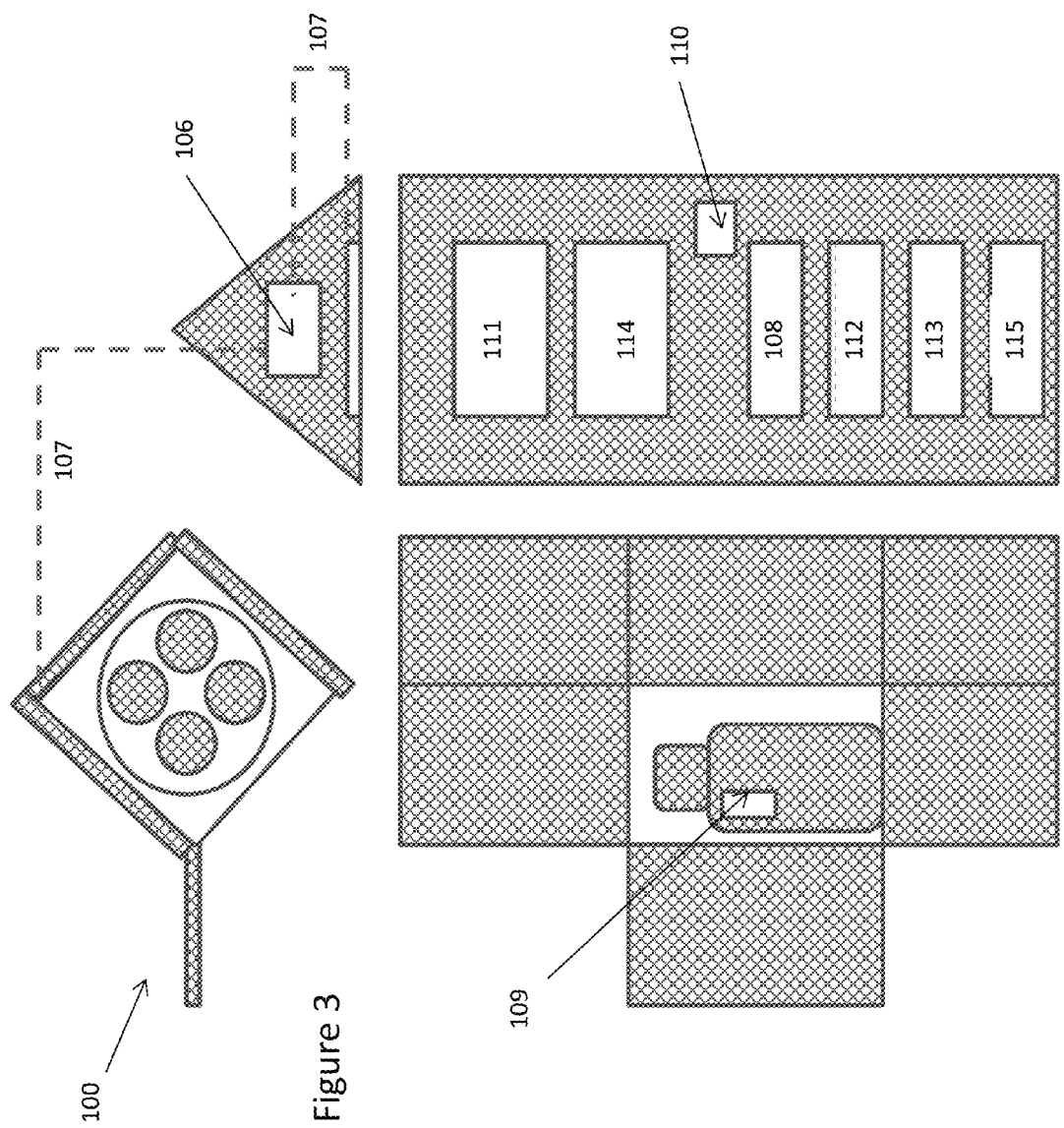
FIG. 3 illustrates an electronic container vending machine in accordance with one embodiment of the present invention.

Illustrative embodiments of the invention are described below. While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Figure 4:
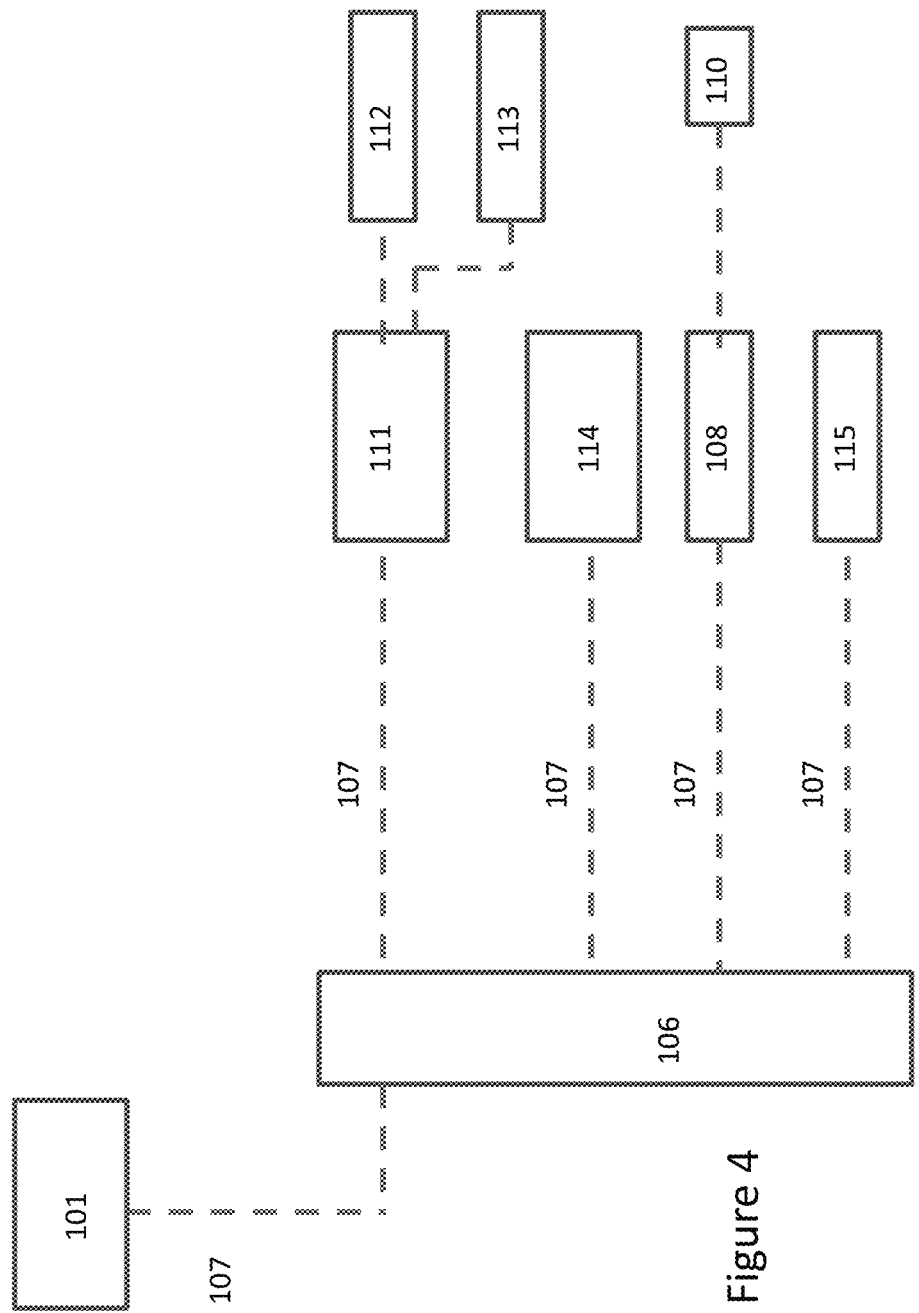
FIG. 4 illustrates the modular vending unit and the control unit in accordance with one embodiment of the present invention.

Turning to FIGS. 1-4, one embodiment of the present invention is an electronic container vending machine 100 is provided that includes at least one modular vending unit 101. This modular vending unit 101 is capable of incrementally rotating and locking in predetermined positions, and includes multiple discrete storage volumes 102 each configured to contain a single container 103. This modular vending 101 also includes an access means 104 for accessing the interior of the rotatable container storage and dispensing unit 105, that is capable of switching between a locked state and an unlocked state, and that is configured to cooperate with the rotatable storage and dispensing unit. The modular vending unit also includes a control unit 106 for communicating with a user and the at least one modular vending unit 101.

The control unit 106 includes an input means and an output means 107, and an electronic container inventory means 108 configured to indicate a quantity of available containers, and a quantity of unoccupied storage volumes. The electronic container inventory 108 means may include RFID tags 109 on the available containers. The electronic container inventory means may include a QR code reader 110.

The control unit also includes an electronic selection means 111 configured to allow the acquisition or return of a container, including an electronic control means 112 for rotating and locking the rotatable container storage and dispensing unit 105 and an electronic control means for locking and unlocking the access means 113. The electronic selection device 111 may be a multi-touch screen display. The electronic payment interface 114 may include a credit card payment interface. The electronic payment interface 114 may include an NFC payment interface.

The control unit 106 also includes an electronic payment interface 114 configured to allow for payments or refunds, and an access permission means 115 configured to rotate the rotatable container storage and dispensing unit 105 to a predetermined position, and allow access to the discrete storage volume 102 by modulating the access means 113.

The containers may be compressed gas cylinders 103. The compressed gas cylinders may contain a welding gas mixture. The welding gas mixture may be argon, carbon dioxide, oxygen, helium, nitrogen, or mixtures thereof. The compressed gas cylinder may contain acetylene.

Another embodiment of the present invention is a method of acquiring gas containers from an electronic container vending machine. This method includes receiving an input from a user by means of an input device, indicating a desired gas container of a specific size and containing a specific gas composition. Then determining the availability of the desired gas container with an electronic container inventory means. Then indicating the availability of the desired gas container to the user by means of an output means. Then receiving a user payment to an electronic payment interface. A discount or promotional value may be accepted via QR reader interface.

Then delivering the desired gas container through an access permission means, thereby rotating a rotatable container storage and dispensing unit to a predetermined position, and switching an access means from a locked state and an unlocked state.

The rotatable container storage and dispensing unit may be capable of incrementally rotating and locking in predetermined positions, including multiple discrete storage volumes each configured to contain a single container.

The input device may include an electronic selection means configured to allow the acquisition or return of a container, comprising an electronic control means for rotating and locking the rotatable container storage and dispensing unit, and an electronic control means for locking and unlocking the access means.

The electronic selection device may include a multi-touch screen display.

The electronic container inventory means may be configured to indicate a quantity of available containers, and a quantity of unoccupied storage volumes. The electronic container inventory means may include RFID tags on the available containers. The electronic container inventory means may include a QR code reader.

The electronic payment interface may be configured to allow for payments or refunds. The electronic payment interface may include a credit card payment interface. The electronic payment interface may include an NFC payment interface.

The access permission means may be configured to rotate the rotatable container storage and dispensing unit to a predetermined position, and allow access to a discrete storage volume by modulating the access means.

In one embodiment of the present invention, one module may house oxygen and other inert gases, while a different module may house acetylene, other combustible gases, and inert gases. The module with the acetylene may be equipped with a lower explosive limit (LEL) meter.

The modules may have provisions for monitoring temperatures and thereby activating ventilation fans under conditions of high ambient or module internal temperatures. Safety alarms may be generated by the system.

What is claimed is:

1. An electronic container vending machine comprising;
    at least one modular vending unit, comprising
        a plurality of gas containers of a plurality of different sizes and containing a plurality of different gas mixtures,
        a rotatable container storage and dispensing unit, capable of incrementally rotating and locking in predetermined positions, comprising multiple discrete storage volumes each configured to contain a single gas container,
        an access means for accessing the interior of said rotatable container storage and dispensing unit, capable of switching between a locked state and an unlocked state, and configured to cooperate with said rotatable storage and dispensing unit,
    a control unit for communicating with a user and said at least one modular vending unit, comprising
        an input means and an output means,
        an electronic container inventory means configured to indicate a quantity of available gas containers, and a quantity of unoccupied storage volumes,
        an electronic selection means configured to allow the acquisition or return of a gas container, comprising an electronic control means for rotating and locking said rotatable container storage and dispensing unit, and an electronic control means for locking and unlocking said access means,
        an electronic payment interface configured to allow for payments or refunds, and
        an access permission means configured to rotate said rotatable container storage and dispensing unit to a predetermined position, and allow access to said discrete storage volume by modulating said access means.

2. The electronic container vending machine of claim 1, wherein said electronic selection device comprises a multi-touch screen display.

3. The electronic container vending machine of claim 1, wherein said electronic payment interface comprises a credit card payment interface.

4. The electronic container vending machine of claim 1, wherein said electronic payment interface comprises an NFC payment interface.

5. The electronic container vending machine of claim 1, wherein said electronic container inventory means comprises RFID tags on the available containers.

6. The electronic container vending machine of claim 1, wherein said electronic container inventory comprises a QR code reader.

7. The electronic container vending machine of claim 1, wherein the container is a compressed gas cylinder.

8. The electronic container vending machine of claim 7, wherein the compressed gas cylinder contains a welding gas mixture.

9. The electronic container vending machine of claim 8, wherein the welding gas mixture is selected from the group consisting of argon, carbon dioxide, oxygen, helium, nitrogen, or mixtures thereof.

10. The electronic container vending machine of claim 7, wherein the compressed gas cylinder contains acetylene.

* * * * *